Oct. 28, 1952 — E. J. SCHWOEGLER — 2,615,820
REMOVABLE PROTECTIVE COATING
Filed March 1, 1949
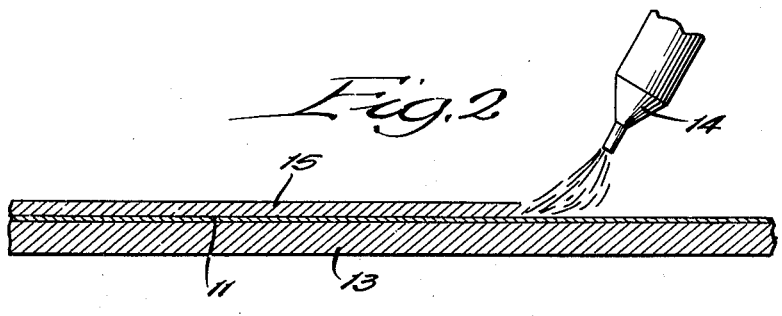
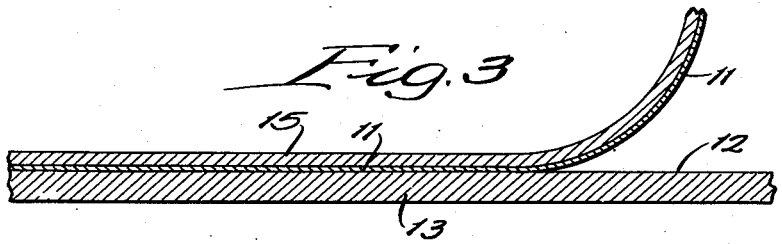
Inventor:
Edward J. Schwoegler,
By Dawson, Ooms, Ortlé and Gangenberg,
Attorneys.

Patented Oct. 28, 1952

2,615,820

UNITED STATES PATENT OFFICE 2,615,820

REMOVABLE PROTECTIVE COATING

Edward J. Schwoegler, Hammond, Ind., assignor to Nox-Rust Chemical Corporation, Chicago, Ill., a corporation of Illinois Application March 1, 1949, Serial No. 78,976

2 Claims. (Cl. 117—6)

This invention relates to a composition for protecting metal surfaces and other finished surfaces from corrosive attack and from abuse by physical contact of one form or another. More particularly, it relates to a multiple layer system applied to the surface to be protected and constited of materials which in their deposited form are capable of resisting attack of the surface by elements normally existing in the atmosphere and which are capable also of absorbing the greater portion of the impact and abrasion forces to which the surface is exposed as an incidence to normal handling. A feature of the invention resides in the characteristics of the coating whereby the layers are readily stripped from the finished surface as a composite mass at the station of use.

The need for a protective coating for finished surfaces is predicated on an industrial system whereby an object or part may be manufactured to an intermediate or finished product at one location and then shipped to a distant station for further processing or for assembly with other parts. In most instances, the part, whether it be a metal part, plastic part, or other structure having a highly finished or coated surface, is manufactured to exact dimension or given a particular finish and it is desirable to prevent corrosive attack or disfiguration of the surface before assembly or before it is located in position of use.

Various systems have been devised to meet existing conditions. Some fabricators make use of expensive wrappings wherein the part is packaged and the wrappings integrated to form an air-tight container to resist atmospheric attack, and they also incorporate sufficient packing to absorb normal impacts and abrasion. It will be apparent that this system is laborious and expensive and, in many instances, it has been found incapable of functioning in the manner for which it is intended. More recently, continuous resinous jackets have been applied to the various parts by a package dip process in a hot melt of the resinous material. This technique is limited to objects of small dimension and it is incapable of use to protect certain areas of products too large to enable treatment by the package dip technique, and, furthermore, it is unsuitable for such large objects because it must be fully enclosed within the film to give satisfactory results.

It is an object of this invention to provide a protective coating that may be applied to protect certain areas of a structure without entirely enclosing the structure; that can be applied with inexpensive equipment without limitation to available facilities, contour of the object to be protected, size of the object having surfaces to be protected and without requiring application by skilled labor; that is capable of remaining in position of use to protect the desired surfaces against corrosive attack and from impacts and abrasion incident to normal handling; that may be readily stripped cleanly from the protected surfaces with little effort and expense.

The invention also contemplates the method for providing the new and improved protective coating composition on surfaces to be protected.

These and other objects and advantages of this invention will hereinafter appear and for purposes of illustration, but not of limitation, an embodiment is shown in the accompanying drawing in which—

Figure 1 is a sectional elevational view indicating a method for applying the strippable film to the surface to be protected;

Figure 2 is a sectional view showing the method for applying the outer protective layer onto the strippable film; and Figure 3 illustrates the reaction when the protective layer is stripped from the surface that has been protected.

Briefly described, the invention is embodied in the application to the surface to be protected of a multiple layer system including a relatively thick outer layer formed of low-cost material capable of absorbing the greater portion, if not all, of the impact and abrasion forces encountered as an incidence to normal handling and which is also relatively impervious to the corrosive elements existing in the atmosphere to which the parts might be subjected, and an inner layer of a film forming material having the characteristics of strong adhesion or integration with the outer layer while resisting penetration of substances of which the outer layer is composed, the inner layer also having the characteristic of adhesion to the surface to be protected sufficient to provide anchorage of the integrated layers to resist inadvertent removal of the integrated layers from the surface being protected by forces encountered as an incidence to normal handling but not so great as to militate against removal of the integrated layers by stripping from the protected surface by forces especially applied.

To the best of my knowledge, no one has protected finished surfaces from corrosive or physical attack with a strippable two-phase coating composition that is easily and effectively applied to specific surface areas without limitation with respect to the size of the part or position of the surface to be protected and which serves adequately as a protective barrier to resist abrasion and corrosive attack by the elements to which the parts might be subjected, and which may be easily and cleanly removed as a composite unit from the protected surface.

The characteristics desired in the outer layer are substantially met by a composition based on the asphaltics which include the bitumens, pyrobitumens, asphalts, pitches, and waxes. Illustrative of such materials are the ordinary asphalts, coal tars, gilsonites, grahamite, petroleum pitch, coal tar pitch, wax, and the like. For best results, asphaltics having a melting point within the range of 140 to 200° F. may be used corresponding to a cone penetration ranging from 10 to 50. When the economics permit, the asphaltics may be wholly or partially substituted with resinous materials of the natural or synthetic type having the characteristics, when in partial substitution, of compatibility with the asphaltic substance to form an outer layer that is rendered tougher and more resistant by the resinous additions. The base materials may be selected without limitation to their film-forming characteristics, it being only necessary that the compound forming the outer layer be capable of meeting the requirements previously described.

With special reference to the use of asphaltics as the base material, certain additives may be incorporated to give body and coherence and strength to the composition and to minimize the tackiness of softer asphaltics and the like. For such purposes, various fillers may be added. These include such relatively inert materials as cork, sawdust, asbestos, ground limestone, powdered silica, chalk, talc, cotton flock, and the like. When fibrous fillers are used, it is preferable to use the shorter variety of less than four mesh, and they are seldom used in quantities greater than one part of filler to two parts of the base resin. When non-fibrous fillers of the type limestone, fuller's earth, silica, and the like are used, the ratio of filler to asphaltic or other base resin may be increased to a one to one ratio.

Application of the outer protective layer may be made from dilute compositions by the process of brushing, flow-coating, spraying, or other suitable means. Dilution may be effected by the solvents which, in the case of the asphaltics, may include coal tar solvents, such as naphtha, benzene, and toluene; petroleum solvents, such as mineral spirits, Solvesso I, II, or III; or other solvents of the type chlorinated hydrocarbons, ketone, or esters. Dilution may also be made by aqueous medium in the form of emulsions or dispersions.

Because of their low cost, a relatively thick film is deposited, calculated to absorb the greater portion, if not all, of the physical forces to which the part might be subjected and to militate against the passage of corrosive elements from the atmosphere. For this purpose, the outer film may range in thickness from 0.010 to 0.50 inch or more. After application, it is usually unnecessary to drive off the diluents by special treatment since the small amount that is used is rapidly dissipated. However, in the event that more rapid setting is desired or in the event that the coating materials are deposited as discrete particles, exposure to elevated temperatures may be employed to drive off the solvent or to integrate the particles by fusion.

The inner coating is formed of a film-forming resinous or rubber-like material having the characteristic of proper balance between sufficient adhesion to the surface to be protected to prevent inadvertent separation therefrom; yet, not so much adhesion as to militate against its clean removal responsive to especially applied forces. Resinous materials having the desired characteristics are selected of the vinyl polymers and copolymers including the copolymers of vinyl chloride-vinyl acetate and the tripolymers of vinyl chloride-vinyl acetate with a dibasic acid such as maleic acid and derivatives thereof. Other film-forming resinous materials suitable for use with glass-like or metallic surfaces and highly finished surfaces include the polyacrylates, such as methyl acrylate, methyl methacrylate, ethyl acrylate, and the like; polystyrenes of various high molecular weights and corresponding chlorinated polystyrenes; cellulose esters and cellulose ethers of the type ethyl cellulose, benzyl cellulose, methyl cellulose, cellulose acetate, cellulose propionate, and the like; rubber-like materials, such as butadiene-acrylonitrile copolymer, butadiene-styrene copolymer, rubber hydrochloride, and chlorinated rubber to mention a few.

Where greater flexibility is desired, the film-forming resinous material may be plasticized with suitable substances which are clearly identified for each plastic in the literature common in the plastics, adhesives, and coating arts.

A modification includes the possible incorporation of corrosion and rust inhibitors which may be selected for their effectiveness with particular metals. These may be selected of a large number of well-known materials consisting of phosphoric acid esters, thiophosphoric acid esters, oxidized paraffin waxes, aldehyde amine condensation products, simple amines, organo-sulphur compounds, and the like. Ordinarily, the amount of rust preventative incorporated is of a low order, ranging from 0.025 to 2.0 percent by weight of the applied composition.

Depending upon the manner of application, the composition from which the inner coating is formed may be of a solventless type, illustrated by the organosols. It may be of relatively high solids content, as illustrated by the hydrosols. It may be adapted for simple application by brushing, spraying, or flow-coating onto the surface to be protected, as indicated in Figure 1 of the drawing, in which instance suitable low viscosities are secured by a composition in which the solids content ranges from 10 to 40 percent. The diluted coating composition may be in the form of an aqueous emulsion, but to provide for a continuous film, it is preferable to deposit the composition from solvent solution. Suitable solvents depend on the materials of which the composition is constituted and they may be selected from proper solvent charts. For example, a vinylite resin of the type VMCH, a vinyl chloride-acetate-maleic acid tripolymer may be diluted with a coal tar solvent, such as xylene, and a ketone, such as methyl isobutyl ketone.

It is desirable to deposit sufficient composition to form more than mono-molecular film in order to secure sufficient strength for purposes of removal in rather large strips. The upper limit of film thickness is dictated solely by the economics of the material employed, and since the resinous materials used for the inner layers are relatively expensive, films ranging from 0.002 to 0.10 are usually applied.

Referring now to the drawing, description will be to examples of suitable compositions and methods of application in the practice of my invention.

*Compositions to deposit a strippable film*

EXAMPLE I

| Material: | Percentage |
|---|---|
| Vinyl chloride-vinyl acetate copolymer (VYHH—Bakelite Corporation) | 10.0 |
| Xylene | 70.0 |
| Methyl isobutyl ketone | 20.0 |
| | 100.0 |

EXAMPLE II

| Material: | Percentage |
|---|---|
| Vinylite tripolymer (copolymer of vinyl chloride-vinyl acetate and a small percentage of unsaturated dibasic acid such maleic acid) | 18.0 |
| Toluene | 50.0 |
| Dibutyl phthalate | 10.0 |
| Methyl Cellosolve | 22.0 |
| | 100.0 |

EXAMPLE III

| Material: | Percentage |
|---|---|
| Polymethyl methacrylate | 20.0 |
| Tricresyl phosphate | 8.0 |
| Thiophosphoric acid ester (rust inhibitor) | 0.20 |
| Benzene | 40.0 |
| Methyl isobutyl ketone | Balance |
| | 100.0 |

EXAMPLE IV

| Material: | Percentage |
|---|---|
| Vinyl chloride-vinyl acetate-maleic acid tripolymer | 18.0 |
| Dibutyl phthalate | 12.0 |
| Xylene | 50.0 |
| Methyl isobutyl ketone | 10.0 |
| Methyl ethyl ketone | 10.0 |
| | 100.0 |

Application of one or the other of the above compositions may be made by a spray gun 10 to deposit a continuous film 11 of small dimension onto the surface 12 of an object 13 to be protected. The surface to be protected may or may not be first dusted with a finely divided relatively inert material, such as silica dust, talc, chalk, diatomaceous earth and the like to deposit a surface layer that eases the removal of the strippable film. Ordinarily the diluent is of a volatile character and air drying is sufficient to permit the immediate application of the outer protective coating, but in the event that faster drying is desired, exposure to elevated temperatures, in the order of 180–200° F., for a short period is sufficient. By air drying or by exposure to elevated temperatures, the deposited film almost immediately becomes sufficiently impervious to prevent penetration of the asphalt or other materials in the after-applied coating to prevent contact thereof with the metal. It has been found that sufficient imperviousness is developed even though all of the solvent has not been removed.

*Compositions to deposit the outer protective layer*

EXAMPLE V

| Material: | Percentage |
|---|---|
| Asphalt (melting point 140 to 200° F.) | 40.0 |
| Gilsonite | 4.5 |
| Cork | 3.2 |
| Asbestos (less than 4 mesh) | 22.0 |
| Naphthol | 30.3 |
| | 100.0 |

EXAMPLE VI

| Material: | Percentage |
|---|---|
| Asphalt | 41.0 |
| Resin ester | 4.5 |
| Powdered limestone | 12.0 |
| Asbestos | 12.0 |
| Benzene | Balance |
| | 100.0 |

EXAMPLE VII

| Material: | Percentage |
|---|---|
| Asphalt (M. P. 160–180° F.) | 35.0 |
| Silica dust | 30.0 |
| Asbestos | 10.0 |
| Toluene | 25.0 |
| | 100.0 |

Application of the coating compositions may be made by a spray gun 14 or by other suitable means including brushing to deposit a relatively thick layer 15 onto the strippable film 11. In view of the small amount of diluent in the applied coating 15, non-tackiness develops in short order, enabling the object 13 with the protective coatings 11 and 15 thereon to be handled in the ordinary manner. The amount of solvent and the effect of the solvent embodied in the coating compositions are incapable of affecting the deposited film 11 to permit penetration thereof to the surface 12, but the solvent is effective to enhance integration or better adhesion between the surfaces 11 and 15. Ordinarily, as previously pointed out, air drying is sufficient to cause the dissipation of the solvents or other diluent, but in the event that more rapid drying is desired, exposure to elevated temperatures may be employed.

EXAMPLE VIII

A strippable film may be applied by spraying a hot melt of a low viscosity vinyl acetate resinous material, such as AYAB (Bakelite Corporation), plasticized with about 10 percent chlorinated diphenyl and further liquified by the addition of about 5 percent tetrachlornaphthalene.

An asphaltic composition having a melting point between 160–180° F. blended with about 25 percent silica dust may be applied onto the strippable film by spraying as a hot melt at temperatures of about 220–250° F.

By employing hot melt systems of the type described, solidification to non-tacky condition occurs almost immediately upon application to present surfaces capable of immediate handling.

It will be apparent from the description that I have found a new and improved composition and method for applying the same for the protection of finished surfaces against the effects of abrasion, dust, and corrosion elements that exist in the atmosphere to which the object might be exposed.

It will be understood that numerous changes may be made in the formulations with respect to

I claim as my invention:

1. An article of manufacture comprising a metallic body having a strippable protective coating thereon, said strippable protective coating comprising an inner continuous film-forming rubbery resinous layer of a thickness of about 0.002 to about 0.1 inch and having limited adhesion to said metallic body at room temperatures, said rubbery resinous layer being selected from the group consisting of vinyl chloride-vinyl acetate copolymers, polystyrenes, polyacrylates, polyethylenes, butadiene-acrylonitrile copolymers, butadiene-styrene copolymers, rubber hydrochlorides and chlorinated rubbers, and an outer layer of a normally solid asphaltic material having a melting point of 140° F. to 200° F. and of materially greater thickness than that of the inner layer and effective to resist the forces and elements to which said body is normally subjected, said inner layer being resistant to the penetration of the substances of the outer layer and anchoring the outer layer to the surface of said body, said protective coating being cleanly strippable from said body responsive to force applied for such purpose.

2. An article of manufacture in accordance with claim 1, wherein the asphaltic outer layer contains a finely divided filler in proportions of about 20 to 60 parts of filler to 40 to 80 parts of the asphaltic material.

EDWARD J. SCHWOEGLER.

REFERENCES CITED

The following references are of record in the file of this patent:

UNITED STATES PATENTS

| Number | Name | Date |
|---|---|---|
| 2,047,772 | Eckert | July 14, 1936 |
| 2,050,239 | Albright et al. | Aug. 11, 1936 |
| 2,215,340 | Vasen | Sept. 17, 1940 |
| 2,394,101 | Phillips et al. | Feb. 5, 1946 |
| 2,441,227 | Pineles | May 11, 1948 |
| 2,455,855 | Murphy et al. | Dec. 7, 1948 |